US008289884B1

(12) United States Patent
Fishman et al.

(10) Patent No.: US 8,289,884 B1
(45) Date of Patent: Oct. 16, 2012

(54) SYSTEM AND METHOD FOR IDENTIFICATION OF UNKNOWN ILLICIT NETWORKS

(75) Inventors: Vladimir Fishman, Farmington, CT (US); William A. Eginton, Leesburg, VA (US); Yuri Galperin, Herndon, VA (US)

(73) Assignee: Dulles Research LLC, Reston, VA (US)

( * ) Notice: Subject to any disclaimer, the term of this patent is extended or adjusted under 35 U.S.C. 154(b) by 0 days.

(21) Appl. No.: 12/353,769

(22) Filed: Jan. 14, 2009

Related U.S. Application Data

(60) Provisional application No. 61/021,024, filed on Jan. 14, 2008.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/255; 370/248; 370/252; 717/104; 717/120; 717/155; 717/162; 702/181

(58) Field of Classification Search .................. 370/248, 370/252, 255; 700/47, 49, 93; 714/37, 38; 717/104, 120, 155, 162; 702/181
See application file for complete search history.

(56) References Cited

U.S. PATENT DOCUMENTS

| | | | |
|---|---|---|---|
| 5,748,497 A * | 5/1998 | Scott et al. ................. 702/181 |
| 6,324,510 B1 * | 11/2001 | Waibel et al. ............. 704/256.7 |
| 6,745,157 B1 * | 6/2004 | Weiss et al. ................. 703/2 |
| 7,047,169 B2 * | 5/2006 | Pelikan et al. .............. 703/2 |
| 7,180,418 B1 * | 2/2007 | Willms et al. ............. 340/568.1 |
| 7,216,123 B2 * | 5/2007 | Kamvar et al. ................ 1/1 |
| 7,275,014 B1 * | 9/2007 | Koren et al. ................. 702/150 |
| 7,421,351 B2 * | 9/2008 | Navratil ........................ 702/58 |
| 7,626,969 B2 * | 12/2009 | Hart et al. .................... 370/338 |
| 2004/0002776 A1 * | 1/2004 | Bickford ....................... 700/30 |
| 2005/0081130 A1 * | 4/2005 | Rinderknecht et al. ....... 714/726 |
| 2005/0240544 A1 * | 10/2005 | Kil et al. ..................... 706/45 |
| 2006/0215583 A1 * | 9/2006 | Castagnoli .................. 370/254 |
| 2007/0220606 A1 * | 9/2007 | Omote et al. ................. 726/24 |
| 2007/0250930 A1 * | 10/2007 | Aziz et al. .................... 726/24 |
| 2008/0082543 A1 * | 4/2008 | Abhishek et al. .............. 707/10 |
| 2008/0162384 A1 * | 7/2008 | Kleist et al. .................. 706/12 |
| 2008/0162397 A1 * | 7/2008 | Zaltzman ..................... 706/48 |
| 2008/0209521 A1 * | 8/2008 | Malaney ....................... 726/4 |
| 2009/0006290 A1 * | 1/2009 | Gunawardana et al. ....... 706/14 |
| 2009/0024549 A1 * | 1/2009 | Johnson ....................... 706/46 |
| 2009/0034434 A1 * | 2/2009 | Tsang et al. ................. 370/256 |
| 2009/0043615 A1 * | 2/2009 | Belhe et al. .................... 705/4 |
| 2009/0125349 A1 * | 5/2009 | Patil et al. ..................... 705/7 |
| 2010/0115621 A1 * | 5/2010 | Staniford et al. .............. 726/25 |

* cited by examiner

*Primary Examiner* — Michael Thier
*Assistant Examiner* — Benjamin H Elliott, IV
(74) *Attorney, Agent, or Firm* — Whitham, Curtis, Christofferson & Cook, P.C.

(57) ABSTRACT

A method and system for identifying unknown illicit networks uses node data, link data, and network data in a recursive analysis that computes node probabilities by combining patterns based on nodes, links and the topology of the network structure present simultaneously in the data. An iterative balancing algorithm is used to make the probability values self-consistent.

20 Claims, 1 Drawing Sheet

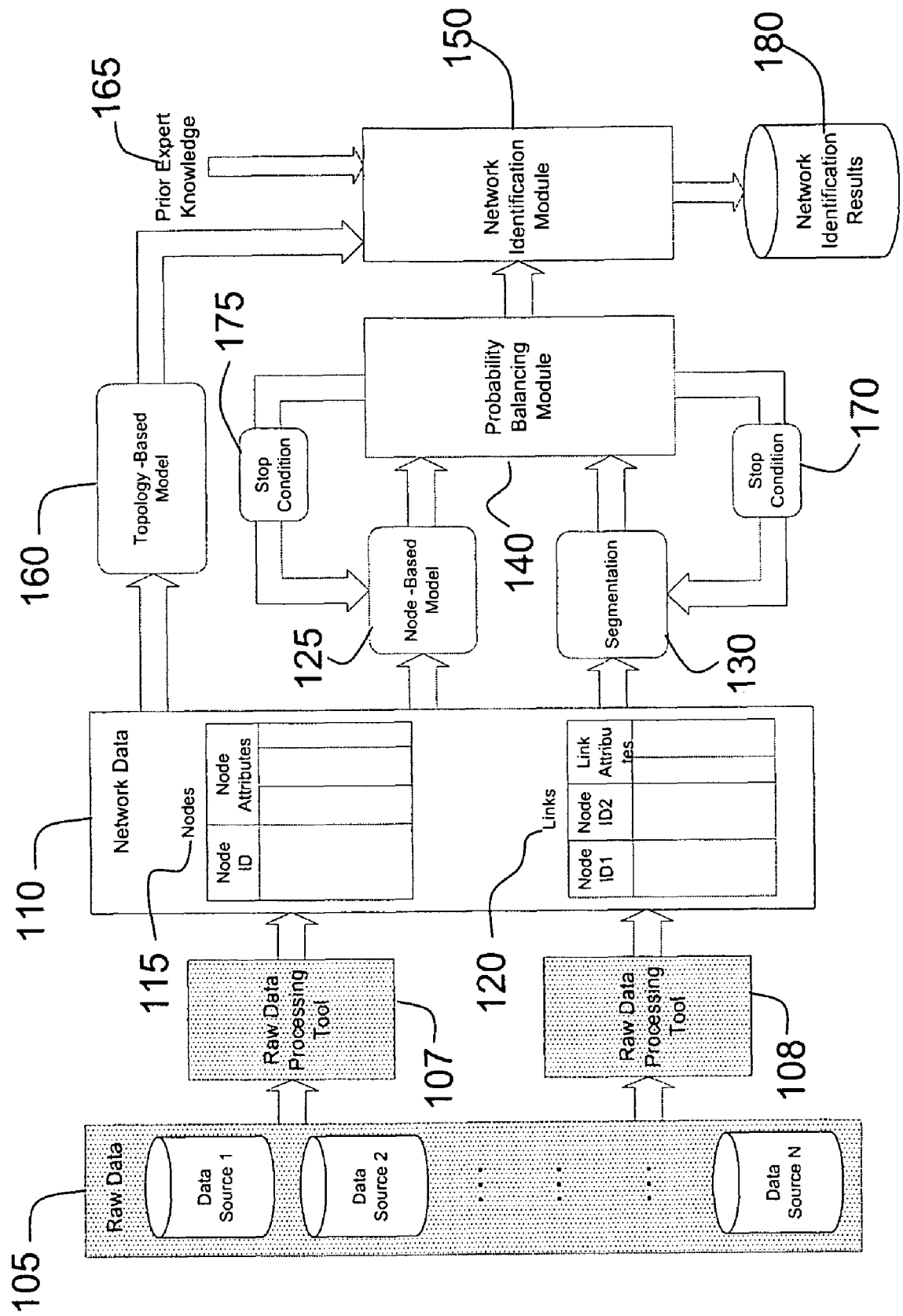

SYSTEM AND METHOD FOR IDENTIFICATION OF UNKNOWN ILLICIT NETWORKS

This application claims priority from U.S. Provisional Patent Application No. 61/021,024 of the same title filed on Jan. 14, 2008.

BACKGROUND OF THE INVENTION

1. Field of the Invention

The present invention generally relates to methods for the identification of unknown networks, and in particular to methods using a graph space including nodes and links representing network actors and their interactions to identify unknown illicit networks.

2. Background Description

In the art of illicit network identification a universe of actors is represented by nodes of a graph. There is a vector of node attributes associated with each node. Actors interact with each other, and their interactions are represented by the links of the graph, each link having a vector of attributes associated with it. It is assumed that there are subsets of the universe of actors that belong to illicit networks. Multiple networks may exist. Networks may interact with each other and compete for resources. The goal of network identification is to accurately determine which actors are members of an illicit network. We will call them "bad" nodes as opposite to "good" nodes.

Central to the problem of illicit network identification is the problem of recognition of patterns in the input data. Some patterns are based on the node attributes only, when the fact of a membership in the network is defined solely by an actor's attributes. Skilled adversaries easily defeat this pattern. Other patterns may be based on the links of a given node and that link's attributes. Still other patterns may be based on the topology of the network itself as, for example, with a particular hierarchical network structure. Further, the properties of the network as a whole (e.g., network size and composition) may be telling. In the general case, all these patterns are present simultaneously in the complex interactions that define network behavior.

Prior art methodologies generally employ the simplification of two-dimensional data-sets, which makes it difficult to analyze all these patterns together. Therefore, what is needed for viable network identification is a capability for analyzing the entire graph space.

SUMMARY OF THE INVENTION

It is therefore an object of the present invention to provide an analytical resource to load and process the entire graph space.

It is a further object of the invention to process the entire graph space while examining each pattern component individually.

It is also an object of the invention to examine each pattern component not only individually but in the context of all components.

The invention offers distinct analytic subsystems to identify and measure these patterns. By adaptively and automatically assigning more weight to patterns that are more predictive in each particular case, the invention leverages the full scope of available pattern information.

For the purposes of the invention it is important to treat membership in an illicit network as a binary property of a node. Even though the probability of a node to belong to a network is an intermediary property, ultimately a decision should be made regarding each node as to whether or not it belongs to a network.

The present invention identifies previously unknown illicit networks that hide in plain sight. By exploiting a numerical solution that simultaneously examines network nodes and links, the invention enables the discovery of network threats in large static or streaming datasets. Further, this analysis and discovery is performed on the shifting, irregular data structures common to large-scale network analysis and does not require the simplifying order of conventional two-dimensional datasets required by conventional, historical methodologies.

An aspect of the invention is a computer implemented method for identifying unknown illicit networks. The method relies upon node data and link data for a plurality of nodes, each node representing an actor and the node data comprising attributes of the node, each link representing an interaction between nodes and the link data comprising attributes associated with the link. One step in the method is training a node-based probability model iteratively using the node data and the link data, iterating until a stop condition is exceeded, each iteration recursively using a probability of each node as input for computation of a probability of each other node. A further step in the method is training a topology-based model using network data. The last step in the method is solving a maximum likelihood problem based on the node probabilities from the recursive iteration, using as constraints output of the topology-based model, and determining whether each of the nodes is illicit ('bad') or not ('good').

In a further aspect of the invention the node based model may be a conditional probability based model or a cluster-based model. In addition, the step of solving a maximum likelihood problem employs an expert to evaluate what-if scenarios using different values of the constraints.

In yet another aspect of the invention, the foregoing method may be implemented as a system having means for performing the steps. The invention may also be described in an implementation on a server having processors for executing software modules for performing the foregoing steps.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is schematic diagram showing operation of a preferred implementation of the invention.

DETAILED DESCRIPTION OF A PREFERRED EMBODIMENT OF THE INVENTION

Network Identification vs. Data Mining

The problem of network identification is fundamentally different from conventional data mining problem sets. To achieve maximum utility, and to best exploit the inherent information that resides in network data sets, network identification and analysis require the development of new mathematical algorithms specific to the task.

The issues that differentiate network identification from traditional data mining are:

1. The input data, nodes and links, by its nature are in a form different from a flat file form suitable for traditional regression modeling. Flat file, table of rows and columns, with one row corresponding to one observation, does not fit the network data structure.

2. The influence of neighboring nodes and links depends greatly on whether those neighbors are "good" or "bad". However, that very insight must be determined simultaneously with the "goodness" of the node in question. The simultaneity of this analysis requires a recursive mathematical technique that is used in the implementation of the present invention. This technique examines nodes and links in a reflexive context, and converges on true measures of network behavior.

3. Much of the important information exists in the form of expert knowledge and heuristics. There is a requirement to incorporate that knowledge into strict mathematical procedures. The present invention meets this requirement.

4. Some information like network size and composition cannot be expressed through parameters of the nodes, as would be the case in a traditional regression analysis; network-level information must be utilized in the network discovery and identification analysis.

Problem Formulation

Input

A set of nodes with associated node attributes and a set of links with associated link attributes are mandatory input data sets.

In addition, there are data elements that are a part of the input, if known. For example:

known membership in a network—for some nodes it may be known with certainty if they are members of an illicit network or not;

prior probabilities—for some nodes prior probabilities to belong to a network may be known based on, for example, values of certain node attributes or the association of a node with a cluster with known average probability to be "bad";

expert information about networks as a whole, e.g., size of a network, resource constraints, certain number of members with specific characteristics, limitations on co-membership, mutually exclusive or mandatory conditions, composition of a network, etc.;

historical datasets; a set of nodes and links with "bad" and "good" nodes known that is not a part of the operational universe defined above.

The present invention is designed to utilize all available information. At the same time, the invention is a stand-alone, discrete analytic system that does not require integration with external, third-party analytic tools.

Output

The standard output of the present invention is a defined set of nodes with known membership of illicit networks.

Notation

The following notation is used in the rest of this disclosure.
Networks: $N_j$ j=1 . . . J
Nodes: $S_i$ i=1 . . . N
Links: $L_m$ m=$m_1$ . . . $m_{NL}$
Node attributes: $A_k^i$ k=$k_1$ . . . $k_A$
Link attributes: $B_k^m$ k=$k_1$ . . . $k_B$ Process Flow The process flow of the present invention is shown in FIG. 1. The present invention can process data 110 that is in the form of nodes 115 and links 120 as shown. If needed, the data should be converted to that form from its raw format 105 using processing tools (107,108) outside of the present invention.

The identification of the network(s) takes place in the Network Identification Module 150. This module assigns each node to one of the illicit networks, or excludes a node from any network, by solving a maximum likelihood problem. Node probabilities, the input to the maximum likelihood problem, come from the Probability Balancing Module 140. The expert knowledge 165 and patterns related to the network as a whole comes as an input to the Network Identification module 150 in the form of constraints. This is how the integration of expert knowledge, heuristics, and network-level information (see above, contrast with data mining) occurs.

The probability that a node belongs to the network is calculated during an iterative process through interaction of the Node-Based Model Module 125, Segmentation Module 130 and Probability Balancing Module 140. A node-based model 125 is built for each iteration of the process flow, based on the data about the node 115 and its neighbors, including link data 120 and current values of the neighbors' probabilities. Then, all probabilities are adjusted and self-coordinated in the Probability Balancing Module 140. If the node-based model 125 requires segmentation 130, segmentation 130 can be performed upon each iteration, or, instead (through user-controls) only at initialization.

The high-level process flow is as follows:

1. Train a node-based model(s) 125 using current values of probabilities to be "bad" as a dependent variable. Node attributes, neighbor node (NB) attributes and corresponding link attributes are independent attributes in that modeling procedure. Some model types require segmentation 130 of the data to be performed first.

2. Calculate new values of probabilities based on the new set of models.

3. Iterate through 1 and 2 until stop condition (170, 175) is satisfied. For example, iterations may continue until a predetermined number of iterations have been executed or until changes in value from one iteration to the next are below a predetermined threshold.

4. Train a topology-based model 160.

5. Solve a maximum likelihood problem in Network Identification Module 150; assign each node to some illicit network(s) ("bad" nodes) or to no network ("good" nodes), and output these results 180.

Node-Based Models

The first intermediary step in the data flow is training a node-based model 125. The calculated probability of a node to belong to a sub-network can be expressed as a function of node parameters, link parameters of all links associated with that node, and the probabilities that the linked nodes belong to the network.

$$p_i^j = F(A_i, B_{i0}, \ldots B_{iMi}, p_{i0}, \ldots p_{iMi}) \quad (1)$$

Modeling can be performed in many different ways. The following is a description of two modeling approaches. The first is a general conditional probability-based approach. The second is a clustering-based approach, which is an important special case when the result of clustering is meaningful and the probability of a node to be bad can be predicted based on cluster membership and on the number of links to 'bad'/'good' nodes from different clusters. Clustering can be non-supervised if it is based on node and/or link attributes only. If the node probabilities of a current iteration are used as well we term the process "supervised" clustering.

Both conditional probability and clustering modeling approaches are available as a part of the present invention's network identification system.

Conditional Probability-Based Models

The main component of the model is a conditional probability, Sj, of a node N to be 'bad' under a condition that it has a neighbor NB connected via the link L. To calculate this probability any traditional modeling technique can be applied to the following training set:

$(N_1, N_2, \ldots N_m, L_1, L_2, \ldots L_k, NB_1, NB_2, \ldots NB_{m+1})$
$(N_0)$, where $N_1, N_2, \ldots N_m$)—attributes of a given node;
$N_0$—dependent variable (1—if a node is 'bad', 0—if a node is 'good');
$(L_1, L_2, \ldots, L_k)$—attributes of the link;
$(NB_1, NB_2, \ldots, NB_{m+1})$—attributes of the neighbor (including the score or flag if the neighbor is 'bad').

The second component (optional in a general case) is a probability, $S_o$, of a node to be 'bad' based only on node attributes. That score can be obtained by training a regression model on a data set $(N_1, N_2, \ldots N_m)(N_0)$ Based on $(S_1, S_2, \ldots S_q)$ for all neighbors and $S_0$ the final probability that the node is 'bad' can be calculated according to the following formula, as $$P(B) == \frac{S_1 \cdot S_2 \ldots S_q \cdot \left(\frac{1}{S_0}\right)^{q-1}}{S_1 \cdot S_2 \ldots S_q \cdot \left(\frac{1}{S_0}\right)^{q-1} + (1-S_1) \cdot (1-S_2) \ldots (1-S_q) \cdot \left(\frac{1}{1-S_0}\right)^{q-1}} \quad (*)$$

1. The model is meant to be used as a part of the present invention's standard modeling/probability balancing loop.
2. Clustering of any form (on nodes or links or both) is expressed simply as a new attribute in the datasets above.
3. Each link that goes to/from a node known to be 'good' or 'bad' provides a record in a training set for the model. The ratio of records of the training set, over the parameters required to fit this model, produces a model that is an order of magnitude more robust than transactional models (which have more parameters to fit and many fewer records for training).
4. If the pattern to recognize is the composition of neighbors of certain type, the model gives a partial credit for the presence of some of the right neighbors, which in a situation of incomplete information is more a positive than a negative indication.

Cluster-Based Models

This approach is effective when the dataset can be divided into clusters and all nodes within clusters influence the probabilities in a similar way. Clustering itself can be done using a number of different approaches. We use a combination of algorithms for link and attribute-based clustering. The simplest approach is to assume that the result depends only on the total number of 'good'Pbad' connections to each cluster and corresponding probabilities, and use logistic regression as a classifier:

$$p_{ij} = \frac{\exp\left(a_0 + \sum_{m \in L, s=s(m)} (a_s^+ p_m + a_s^- (1-p_m))\right)}{1 + \exp\left(a_0 + \sum_{m \in L, s=s(m)} (a_s^+ p_m + a_s^- (1-p_m))\right)} \quad (2)$$

Node attributes can be added to the logistic regression in a straightforward way.

Probability Balancing Module

The probability of each node can be considered as an output of a probability model depending on neighboring nodes and corresponding links. At the same time, the probability is used as an input for computation of probability values for other nodes. This duality constitutes the specific complexity of the identification problem. Resolution of the network identification problem cannot be accomplished absent this recursive process. An iterative balancing algorithm is used to make the probability values self-consistent.

Topology-Based Models

The topology of a node close neighborhood (representing a fine network structure) can be an important predictor of illicit network membership. If corresponding historical data is available, prediction can be made based on a specific decomposition of the network. The corresponding Eigen values are used as predictive attributes. This technique is implemented in the present invention and has proven to be an efficient classifier. This method may be a standard element in network classification based on the present invention.

Network Identification Module

The Identification Module 150 performs the assignment of "bad" nodes to the illicit network(s). It delivers a solution to the maximum likelihood problem where probabilities calculated on previous steps are used as inputs, and expert knowledge 165 and the output of the topology-based model 160 are used as constraints. Since this step is very fast it allows an expert to analyze different what-if scenarios reflecting different constraints and conditions.

Mathematically the problem is to maximize a utility function u, which is the log-likelihood over all nodes, while satisfying constraints that are applied on metrics and node level conditions.

Node weight $w_i^j$ is a measure of total propensity of node i to belong to network j.

$$u_i^{j+} = \frac{\exp(w_i^j)}{1 + \exp(w_i^j)}$$

$$u_i^{j-} = \frac{1}{1 + \exp(w_i^j)}$$

$$LogLikelihood = \log\left(\prod_{i,j,i \in N_j} \frac{\exp(w_i^j)}{1 + \exp(w_i^j)} \prod_{i,j,i \notin N_j} \frac{1}{1 + \exp(w_i^j)}\right) \sim \sum_{i,j} a_i^j w_i^j$$

Utility function $w_i^j$ is measure of total log-likelihood of node i to belong to network j.

The problem of assignment identification can now be formulated in the following way:

$$\max \sum_{i,j} a_i^j w_i^j \quad (1)$$

$$\sum_{i,j} a_i^j v_i^j < C_k \quad (2)$$

$$\sum_{j} a_i^j s_i^j < A_i \quad (3)$$

$$a_i^j \in [0, 1] \quad (4)$$

Conditions (2) may include limitations on the total number of members in a group, resource restrictions, and financial restrictions based on domain expertise, among others.

Conditions (3) may include eligibility conditions of membership in a group, limitation on co-membership, and contact rule conditions, among others.

We assume in this implementation of the invention that the probability of a network membership does not depend on membership in other networks (i.e., they are conditionally independent). In another approach interaction effects of some sort can be taken into account.

Dormant networks can be also included in the analysis. A number of generated cells can be added to the dataset to simulate the network members who are not yet identified. Their cell properties and links may be generated based on an actual distribution. They will be included in the network by the identification procedure if constraints cannot be otherwise satisfied.

While the invention has been described in terms of a preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method for identifying unknown illicit networks, a computer performing steps comprising:
    obtaining by the computer node data and link data for a plurality of nodes, the node data comprising attributes of a node, there being one or more links, each link representing an interaction between nodes and the link data comprising attributes associated with the link;
    training by the computer a node-based probability model iteratively using the node data and the link data, iterating until a stop condition is satisfied, each iteration recursively using a probability of each node as input for computation of a probability of each other node;
    training by the computer a topology-based model using network data; and
    solving by the computer a maximum likelihood problem based on said node probabilities from said recursive iteration, using as constraints output of said topology-based model, and determining whether each of said nodes is illicit ('bad') or not ('good').

2. The method of claim 1, wherein said node-based probability model is a conditional probability based model.

3. The method of claim 1, wherein said node-based probability model is a cluster-based model.

4. The method of claim 1, wherein the step of solving a maximum likelihood problem employs an expert to evaluate what-if scenarios using different values of the constraints.

5. The method of claim 3, wherein an algorithm for clustering assumes that a node's probability depends only on a total number of 'good'/'bad' connections to each cluster and uses as a classifier a logistic regression of:

$$p_{ij} = \frac{\exp\left(a_0 + \sum_{m \in L, s=s(m)} (a_s^+ p_m + a_s^- (1 - p_m))\right)}{1 + \exp\left(a_0 + \sum_{m \in L, s=s(m)} (a_s^+ p_m + a_s^- (1 - p_m))\right)}$$

where $p_{ij}$ is the probability for the $i^{th}$ node on the $j^{th}$ network, $p_m$ is the probability for the $m^{th}$ link, and $a_s$ are the coefficients of probability for the $s^{th}$ node.

6. The method of claim 2, wherein said conditional probability based model has two components, a first component being a conditional probability that a node is 'bad' under a condition that the node has a neighbor (NB) connected via a link L, and a second component being a probability based only on attributes of the node.

7. The method of claim 1, wherein historical datasets are used to provide additional node data and additional link data.

8. The method of claim 1, wherein historical data corresponding to a node's close neighborhood is available and corresponding Eigen values are used as predictive attributes in the topology-based model.

9. A computer implemented system for identifying unknown illicit networks, comprising:
    a data processing tool for obtaining from raw data node data and link data for a plurality of nodes, the node data comprising attributes of a node, there being one or more links, each link representing an interaction between nodes and the link data comprising attributes associated with the link;
    a first analytic subsystem for training a node-based probability model iteratively using the node data and the link data, iterating until a stop condition is satisfied, each iteration recursively using a probability of each node as input for computation of a probability of each other node;
    a second analytic subsystem for training a topology-based model using network data; and
    a third analytic subsystem for solving a maximum likelihood problem based on said node probabilities from said recursive iteration, using as constraints output of said topology-based model, and determining whether each of said nodes is illicit ('bad') or not ('good').

10. The system of claim 9, wherein said node-based probability model is a conditional probability based model.

11. The system of claim 9, wherein said node-based probability model is a cluster-based model.

12. The system of claim 9, wherein the third analytic subsystem for solving a maximum likelihood problem is adapted to employ an expert to evaluate what-if scenarios using different values of the constraints.

13. The system of claim 11, wherein an algorithm for clustering assumes that a node's probability depends only on a total number of 'good'/'bad' connections to each cluster and uses as a classifier a logistic regression of:

$$p_{ij} = \frac{\exp\left(a_0 + \sum_{m \in L, s=s(m)} (a_s^+ p_m + a_s^- (1 - p_m))\right)}{1 + \exp\left(a_0 + \sum_{m \in L, s=s(m)} (a_s^+ p_m + a_s^- (1 - p_m))\right)}$$

where $p_{ij}$ is the probability for the $i^{th}$ node on the $j^{th}$ network, $p_m$ is the probability for the $m^{th}$ link, and $a_s$ are the coefficients of probability for the $s^{th}$ node.

14. The system of claim 10, wherein said conditional probability based model has two components, a first component being a conditional probability that a node is 'bad' under a condition that the node has a neighbor (NB) connected via a link L, and a second component being a probability based only on attributes of the node.

15. The system of claim 9, wherein historical datasets are used to provide additional node data and additional link data.

16. The system of claim 9, wherein historical data corresponding to a node's close neighborhood is available and corresponding Eigen values are used as predictive attributes in the topology-based model.

17. A server having software modules stored thereon for identifying unknown illicit networks, and having a processor operable to execute the software modules, the software modules comprising:

first computer code for obtaining node data and link data for a plurality of nodes, the node data comprising attributes of a node, there being one or more links, each link representing an interaction between nodes and the link data comprising attributes associated with the link;

second computer code for training a node-based probability model iteratively using the node data and the link data, iterating until a stop condition is satisfied, each iteration recursively using a probability of each node as input for computation of a probability of each other node;

third computer code for training a topology-based model using network data; and fourth computer code for solving a maximum likelihood problem based on said node probabilities from said recursive iteration, using as constraints output of said topology-based model, and determining whether each of said nodes is illicit ('bad') or not ('good').

18. A server having software modules stored thereon for identifying unknown illicit networks as in claim 17, wherein said node-based probability model is a conditional probability based model.

19. A server having software modules stored thereon for identifying unknown illicit networks as in claim 17, wherein said node-based probability model is a cluster-based model.

20. A server having software modules stored thereon for identifying unknown illicit networks as in claim 17, wherein fourth computer code for solving a maximum likelihood problem is adapted to employ an expert to evaluate what-if scenarios using different values of the constraints.

* * * * *